United States Patent [19]

Weber

[11] Patent Number: 5,642,044

[45] Date of Patent: Jun. 24, 1997

[54] METHOD AND APPARATUS FOR EXCITING A THREE-PHASE VARIABLE RELUCTANCE POSITION SENSOR

[75] Inventor: Charles Francis Weber, South Lyon, Mich.

[73] Assignee: Ford Motor Company, Dearborn, Mich.

[21] Appl. No.: 523,316

[22] Filed: Sep. 5, 1995

Related U.S. Application Data

[63] Continuation-in-part of Ser. No. 308,790, Sep. 19, 1994, Pat. No. 5,489,845.

[51] Int. Cl.$^6$ .................................. G01B 7/30; H02P 7/01
[52] U.S. Cl. ............................ 324/207.25; 318/432
[58] Field of Search .................... 324/207.25, 207.16, 324/207.15, 209, 225, 207.12; 318/431, 432, 434, 439, 433

[56] References Cited

U.S. PATENT DOCUMENTS

| | | | |
|---|---|---|---|
| 3,778,691 | 12/1973 | Poppinger et al. . | |
| 4,163,928 | 8/1979 | Patterson et al. | 318/573 |
| 4,277,735 | 7/1981 | Okuyama et al. | 318/766 |
| 4,385,267 | 5/1983 | Herbert et al. | 318/732 |
| 4,461,994 | 7/1984 | MacDonald | 324/174 |
| 4,712,186 | 12/1987 | Fromme | 364/565 |
| 4,825,132 | 4/1989 | Gritter | 318/811 |
| 4,835,448 | 5/1989 | Dishner et al. | 318/254 |
| 4,991,301 | 2/1991 | Hore | 33/366 |
| 5,012,171 | 4/1991 | Sember | 318/696 |
| 5,107,213 | 4/1992 | Ponticelli et al. | 324/207.25 |
| 5,194,794 | 3/1993 | Shamoto . | |
| 5,320,421 | 6/1994 | Kade et al. . | |
| 5,444,341 | 8/1995 | Kneifel, II et al. | 318/432 |

Primary Examiner—Sandra L. O'Shea
Assistant Examiner—Roger Phillips
Attorney, Agent, or Firm—Peter Abolins; Roger L. May

[57] ABSTRACT

A method and apparatus for exciting a three-phase variable reluctance motor is used, for example, as an encoder system to commutate a rotor. The system includes a power source, a position sensor and excitation electronics. The position sensor is adapted to generate a plurality of variable induction values corresponding to relative motor torque rankings and absolute angular positions of the rotor. Excitation electronics is provided electric communication with the inductive sensor and the power source and is adapted to generate digital values of the inductance values corresponding to the motor torque rankings. Excitation electronics includes steering logic responsive to the digital values to generate an output signal having a value corresponding to the phase of the motor to apply current to so as to commutate the rotor.

3 Claims, 6 Drawing Sheets

METHOD AND APPARATUS FOR EXCITING A THREE-PHASE VARIABLE RELUCTANCE POSITION SENSOR

CROSS-REFERENCE TO RELATED APPLICATION

This application is a continuation-in-part of patent application Ser. No. 08/308,790, filed Sep. 19, 1994, now U.S. Pat. No. 5,489,845, entitled "Encoder System And Method For Determining Absolute Rotor Position", which has at all times relevant hereto been commonly owned, and the details of which are hereby incorporated by reference.

TECHNICAL FIELD

This invention relates to a method and apparatus for exciting a three-phase Variable Reluctance (VR) position sensor.

BACKGROUND ART

A three-phase Variable Reluctance (VR) motor is a stepper motor controlled by three coils. The motor includes a rotor which inherently seeks a favored or stable detent position when current is flowing. In operation, the rotor will resist movement until it reaches the zero torque unstable position, whereupon it will flip to the next stable detent position. By applying current to the coils at appropriate times, however, the commutation of the rotor may be controlled and the motor may be prevented from reaching one or more of its natural detent positions. To date, electric motor designers have been challenged to develop systems and methods to economically and efficiently perform this task.

Figure 1:
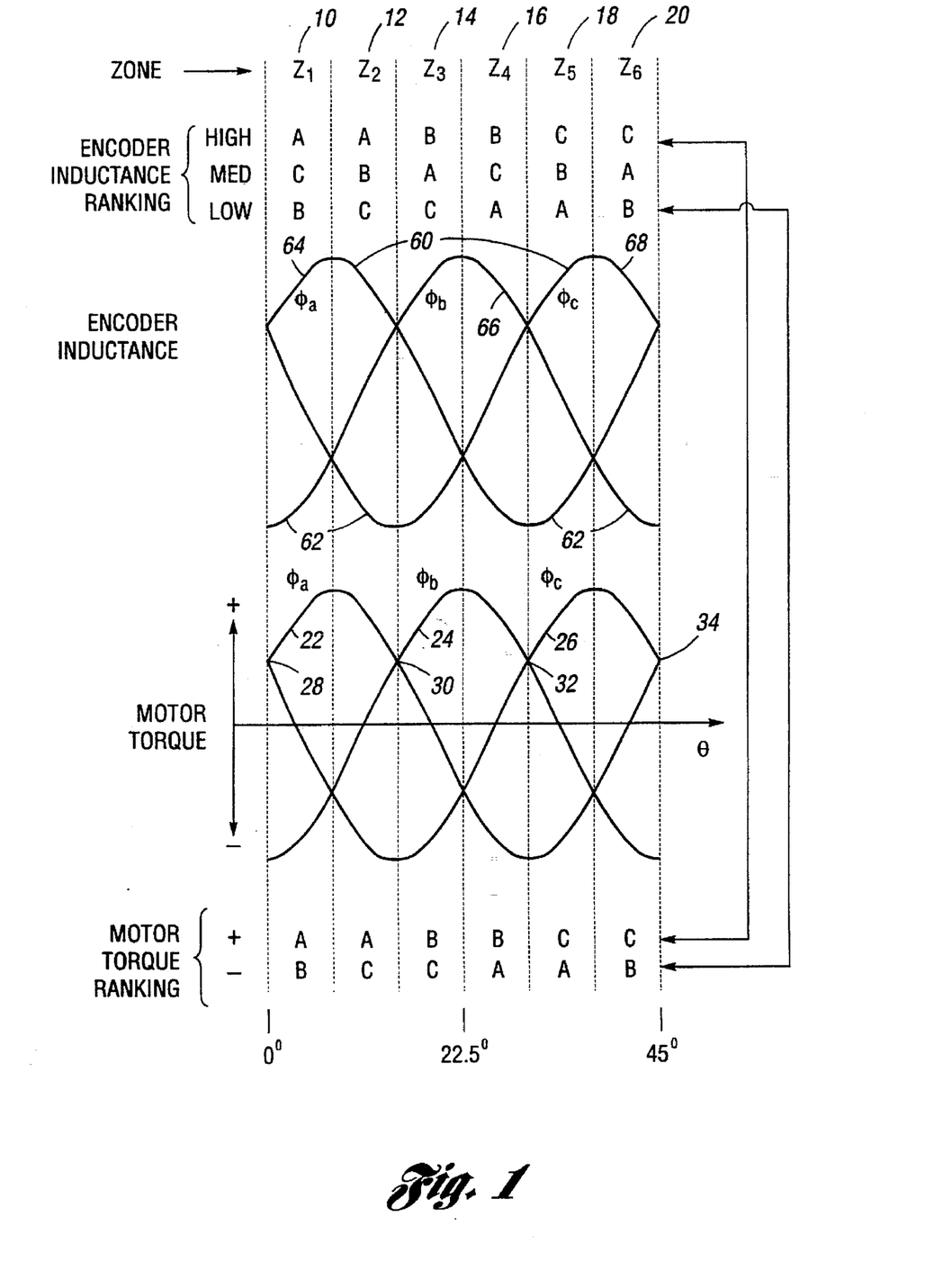
FIG. 1 is a schematic diagram illustrating the motor torque profile for a typical three-phase VR motor at low-speed operation.

Consider, for example, the motor torque profile of a typical three-phase Variable Reluctance motor. As shown in FIG. 1, over an angle of forty-five (45) mechanical degrees (zones $Z_1(10)$, $Z_2(12)$, $Z_3(14)$, $Z_4(16)$, $Z_5(18)$ and $Z_6(20)$, each spanning 7.5°), the output torque of the Variable Reluctance motor may be illustrated by three phase-separated, pseudo-sinusoidal waveforms $\phi_A(22)$ (also called "phase A"), $\phi_B(24)$ (also called "phase B"), and $\phi_C(26)$ (also called "phase C"). As known to those skilled in the art, if it were desirable to generate positive torque (to produce a positive angle) over zones $Z_1(10)$ and $Z_2(12)$ (0°–15°), it would be desirable to have $\phi_A(22)$ on for the entire displacement, i.e., from point 28 to point 30. If $\phi_A(22)$ is left on past point 30 (past 15°), it still generates positive torque. However, for the amount of current being invested in the motor, the torque declines rapidly. The efficiency of the motor is thus greatly reduced. Point 30 is therefore the optimal spot to turn $\phi_B(24)$ on if it is desired to continue positive torque over zones $Z_3(14)$ and $Z_4(16)$ (15°–30°). Likewise, point (32) (30°) is the optimal spot to turn $\phi_C(26)$ on to continue positive torque over zones $Z_5(18)$ and $Z_6(20)$ (30°–45°). At point 32 (30°), the cycle repeats itself such that to continue positive torque, it would be desirable to have $\phi_A(22)$ on from 45°–60°, $\phi_B(24)$ on from 60°–75°, and $\phi_C(26)$ on from 75°–90°.

The converse is also true. Thus, as shown in FIG. 1, to produce negative torque, $\phi_B(24)$ should be on in zone $Z_1(10)$, $\phi_C(26)$ should be on in zones $Z_2(12)$–$Z_3(14)$, $\phi_A(22)$ should be on in zones $Z_4(16)$–$Z_5(18)$, and $\phi_B(24)$ Should be on again in zone $Z_6(20)$.

While it is known that efficient operation of a three-phase Variable Reluctance motor may be achieved under these conditions, electric motor designers have heretofore had difficulty in designing motors to operate accordingly.

Consequently, a need has developed for a system and method for obtaining and utilizing motor shaft (rotor) position information and corresponding motor torque rankings to efficiently commute a three-phase Variable Reluctance motor. Such a system and method should be particularly suited for use with a typical three-phase Variable Reluctance motor and should not require the use of substantially additional hardware or contacting elements which will add additional expense or wear out.

DISCLOSURE OF THE INVENTION

It is an object of the present invention to provide a system and method for exciting a three-phase Variable Reluctance (VR) position sensor.

Still further, it is an object of the present invention to provide an encoder system for commutating the rotor of a three-phase Variable Reluctance (VR) motor in accordance with variable inductance values which are generated and correspond to relative motor torque rankings at absolute angular positions of the rotor.

In accordance with the above-stated objects and other objects, features and advantages of the present invention, there is provided such an encoder system which is specifically directed for use with a three-phase Variable Reluctance (VR) motor. The system includes an inductance sensor adapted to generate a plurality of variable inductance values which correspond to relative motor torque rankings at absolute angular positions of the rotor of the three-phase VR motor. These values may be plotted as phase-separated pseudo-sinusoidal waveforms. The resultant inductance/ position profile corresponds to motor torque rankings at predetermined zones. The profile has near-linear, i.e., sawtooth-like regions with determinable slopes and offsets. Excitation electronics is further provided in electrical communication with the inductance sensor and a power source for generating digital values of the inductance values which correspond to the motor torque rankings. The excitation electronics further includes steering logic responsive to the digital values to generate an output signal having a value corresponding to which coil (phase) of the motor to apply current to so as to commutate the rotor.

In a preferred embodiment, the inductance sensor of the encoder system comprises a stationary arrangement of stationary coils which form a stator and a magnetic salient pole rotating structure which forms a rotor and is free to turn inside or outside of the stator. The rotor has eight salient poles. Also in the preferred embodiment, the stator poles are arranged in three-phased windings distributed in the above-referenced six windings with two coils connected in series in each phase so as to generate three-phase-separated variable inductance values for each rotor position.

Still further, in the preferred embodiment, the excitation electronics comprises a corresponding plurality of powered encoder coils as well as a plurality of switches. Each of the switches are provided in electrical communication with one another and a corresponding encoder coil. A plurality of current sensors is similarly provided, each of which is in electrical communication with a corresponding switch and is further adapted to convert current to voltage.

Still further, a free-running oscillator/clock is provided. A plurality of comparators are also provided, each of which has a first input from a corresponding current sensor and second input from a dynamic reference voltage source, and an output. Each of the comparators is provided as an input to steering logic, the output of which is provided to a plurality of latches which are in electrical communication with one another and the reference voltage source. The memory latches provide inputs to the motor coil power amplifier and an optional microcomputer. In operation, each of the latches converts to a logic "1", one at a time. The first latch input to reach logic 1 turns off the switches, and current begins decaying in the associated encoder coils. Simultaneously, the reference threshold is changed to a new value.

Also in accordance with the present invention, a method for commutating the rotor of a three-phase Variable Reluctance (VR) motor is disclosed. The method includes the steps of generating at an inductance sensor, a plurality of variable inductance values corresponding to the motor torque rankings at absolute angular positions of the rotor. Thereafter, digital values are generated of the inductance values which correspond to the motor torque rankings. Finally, steering logic is applied to the digital values so as to generate a new output signal for receipt by the motor. The output signal contains a value corresponding to which phase (coil) the motor current must be applied so as to commutate the rotor.

These and other objects, features and advantages of the present invention are readily apparent from the following detailed description of the best mode for carrying out the invention when taken in connection with the accompanying drawings wherein like reference numerals correspond to like components.

BEST MODES FOR CARRYING OUT THE INVENTION

Figure 2:
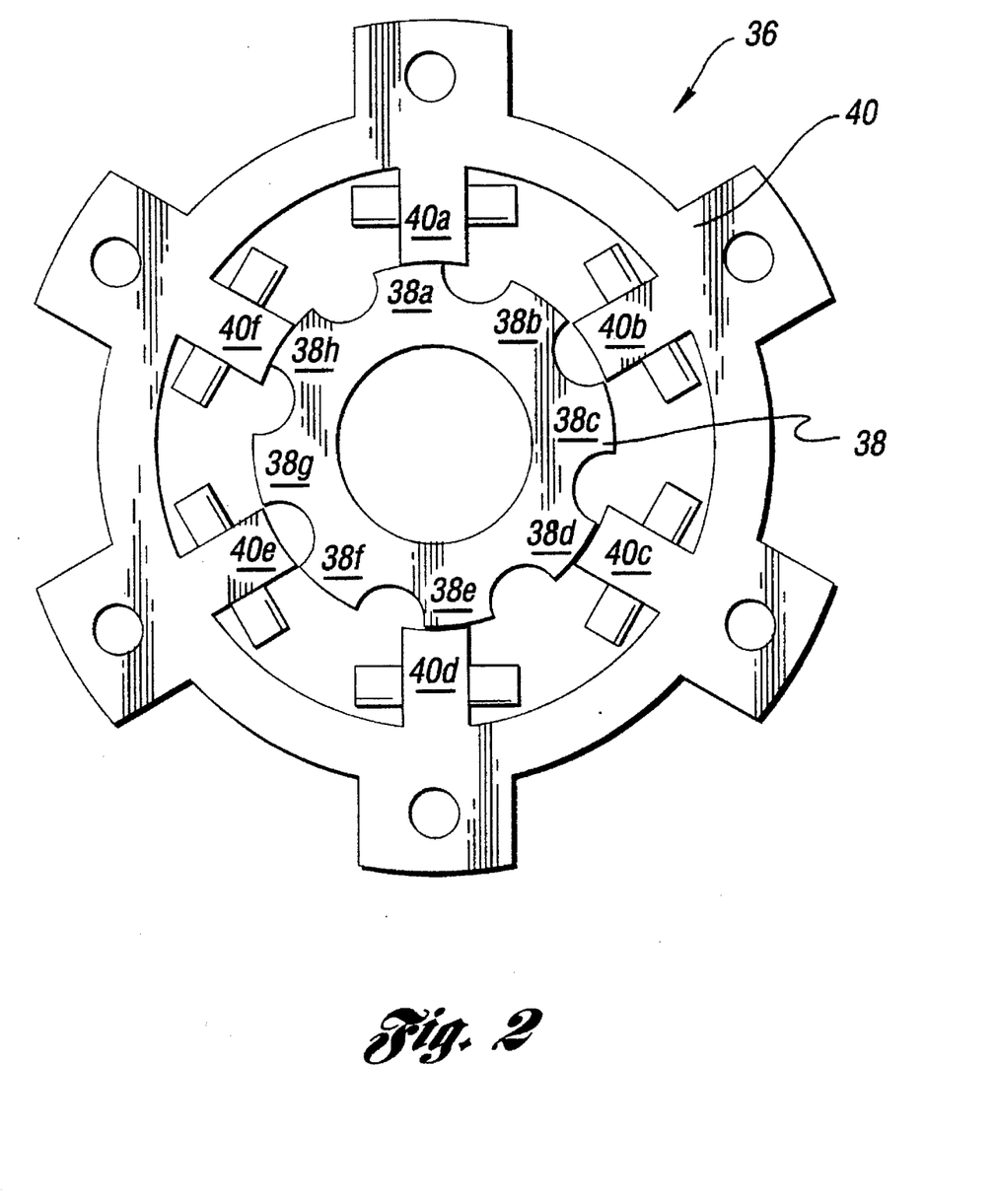
FIG. 2 is a schematic diagram of a cross-section of an inductance sensor used in accordance with the present invention.

FIG. 2 illustrates a schematic diagram of a cross-section of an inductance sensor used in accordance with the teachings of the present invention. The inductance sensor is designated generally by reference numeral 36. Sensor 36 consists of a magnetic salient pole rotating structure, i.e., a rotor 38, which is free to turn inside or outside of a stationary arrangement of stationary coils forming the stator 40. As seen, the number of poles in the rotor structure 38 is not the same as the number of poles in the stator structure 40. As a result, the combination produces a Vernier effect.

Typical rotor-stator pole combinations are 8-6, 4-6, 8-12, etc. Sensor 36 is particularly suited for use with a Variable Reluctance (VR) motor and may physically be placed on back of the VR motor and share the same rotor shaft 42, as shown in FIG. 3.

To enhance the magnetic detection of position and to reduce the detection currents, the stator coils may be wound around a salient pole magnetic structure, i.e., the stator core, as shown. In a preferred embodiment shown in FIG. 2, the rotor 38 is inside of the stator 40 and the stator has six salient poles 40a–40f, and the rotor has eight salient poles 38a–38h. Both the magnetic rotor 12 and the stator 14 are made of electrical steel to minimize eddy currents that might adversely affect the position detection. Typical means of obtaining this are through the use of thin steel laminations, i.e., nickel-steel alloys or other means to increase the magnetic material electric resistivity and reduce the hysteresis losses.

Figure 3:
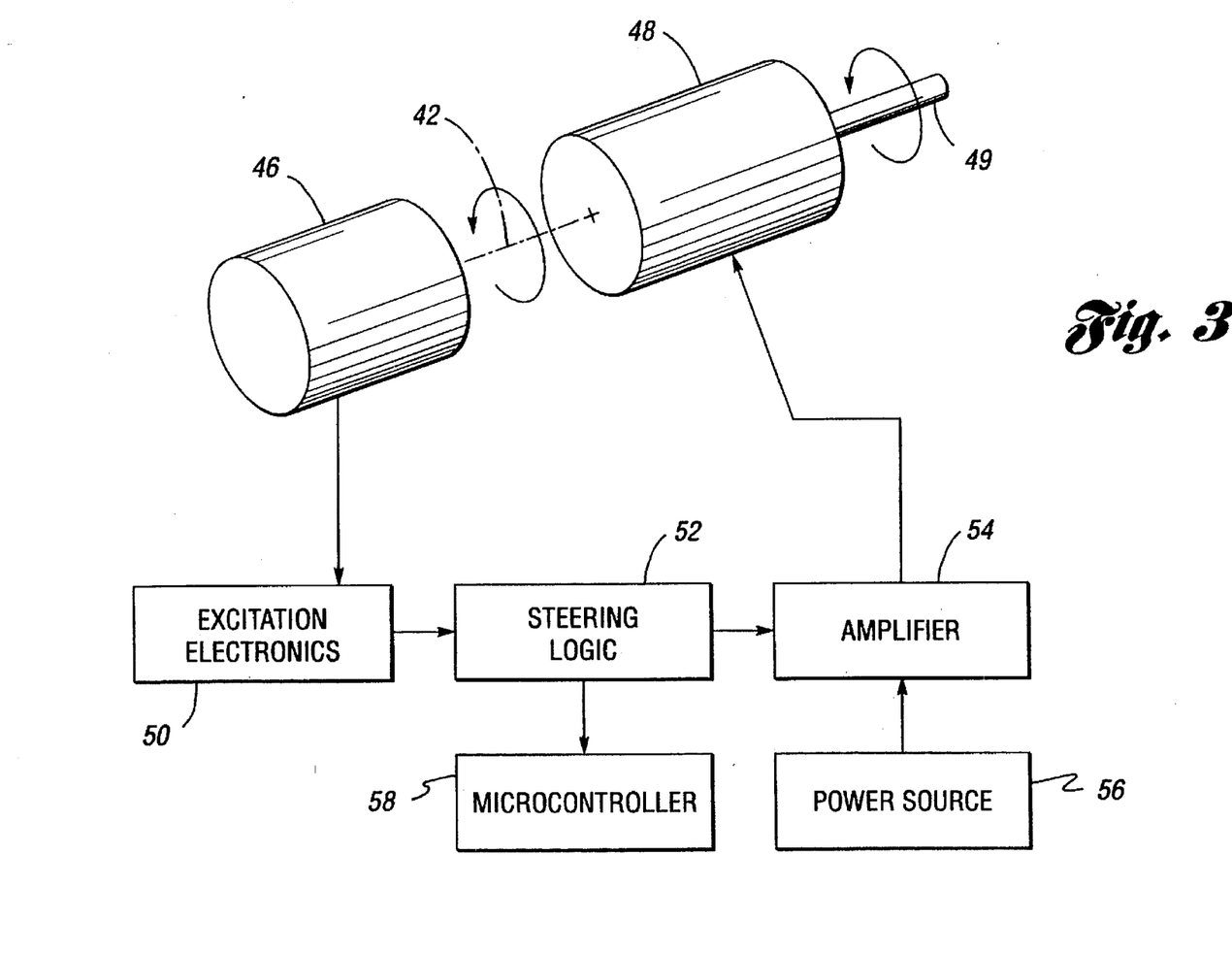
FIG. 3 is a schematic diagram of the encoder system of the present invention.

The schematic diagram of the preferred embodiment of the system of the present invention is shown in FIG. 3. As shown, encoder (position sensor) 46 is electrically and mechanically coupled and physically aligned with VR motor 48 and preferably, but not necessarily share the same rotor shaft 42. Motor 48 has a motor shaft 49. Excitation electronics 50 is provided in electrical communication with encoder 46 as well as steering logic 52. An amplifier 54, in turn, is provided in electrical communication with VR motor 48, steering logic 52 and a power source 56.

The encoder system of the present invention is generally adapted to generate a signal having a value indicative of the phase (coil) of VR the motor 48 to apply current to so as to commutate motor 48. The system may, however, be adapted to determine absolute rotor position. In this embodiment, a microcontroller 58 is provided to receive input from steering logic 52. In operation, microcomputer 58 generates a signal having a value indicative of the angular position of the rotor.

Preferably, the winding connection arrangement is three-phased windings with two coils connected in series in each phase. The self-inductance of each phase is related with the rotor position and relative motor torque rankings. As shown in FIG. 1, for example, the phase self-inductance varies between a maximum crest shown at 60 when a rotor salient pole 38 is aligned with the stator coils, and a minimum valley 62 obtained when the rotor salient pole 38 is not under the particular phase of the stator coil. The mutual inductance between phases is also dependent on the rotor position.

In keeping with the invention, applicant recognizes that highly magnetic permeable materials in the rotor and stator cores will render larger values of the inductances. The width of the valleys 62 and the crests 60 in the inductance versus rotor position/motor torque profiles can, therefore, be controlled by adjusting the width and shape of the salient poles in the rotor 38 and stator 40. The optimum salient pole width combination for the rotor and stator poles provides the maximum inductance variation between crests 60 and valleys 62 as shown in FIG. 1. The optimum also produces crests and valleys of width close to zero and a linear variation of the inductance profile L versus the rotor position/motor torque ranking in the region where the self-inductance of two adjacent phases has the same value.

To reduce the dependence and the effects of the mutual inductances between phases and to reduce the stator magnetization current, all windings and all phases are powered simultaneously, so the effects of mutual coupling between the phases are balanced out. In this manner, the magnetic path is also the shortest given the small stator currents.

It is, of course, desirable to obtain the larger possible value of the variable inductance. This can be obtained by increasing the number of turns in the stator coils, or by using highly permeable materials, or by reducing the air gap between the rotor and stator or, still further, by increasing the cross-sectional area of the poles or, yet still further, by using the combination of all of the above approaches. Of course, the obvious limitation of size and manufacturing costs will set the limits of these variables.

Referring again to FIG. 1 of the drawings, the inductance profile of the position sensor 46 of the present invention is shown. Like the motor torque profile, the inductance profile spans 45 mechanical degrees (zones $Z_1$–$Z_6$) and comprises three phase-separated, pseudo-sinusoidal waveforms $\phi_a(64)$, $\phi_b(66)$, and $\phi_c(68)$. The relationship between the inductance profile of position sensor 46 and the motor torque profile of the three-phase motor is apparent. In zone $Z_1(10)$, for example, $\phi_a(64)$ of the inductance sensor 46 has the highest ranking. In this same zone, $\phi_b(66)$ has the lowest ranking and $\phi_c(68)$ has a mid-ranking. The inductance rankings remain the same for zone $Z_2(12)$ and like the motor torque rankings, change for zones $Z_3(14)$ and $Z_4(16)$. In zone $Z_3(14)$, for example, $\phi_b(66)$ of the inductance sensor 46 has the highest ranking. $\phi_c(68)$ has the lowest ranking and $\phi_a(64)$ has a mid-ranking.

As readily seen, for the low-speed operation scenario of FIG. 1, the inductance profile tracks the motor torque profile. In each zone, positive motor torque corresponds to the position sensor (encoder) phase with the maximum inductance. Similarly, negative motor torque corresponds to the position sensor phase with the minimum inductance.

Figure 4:
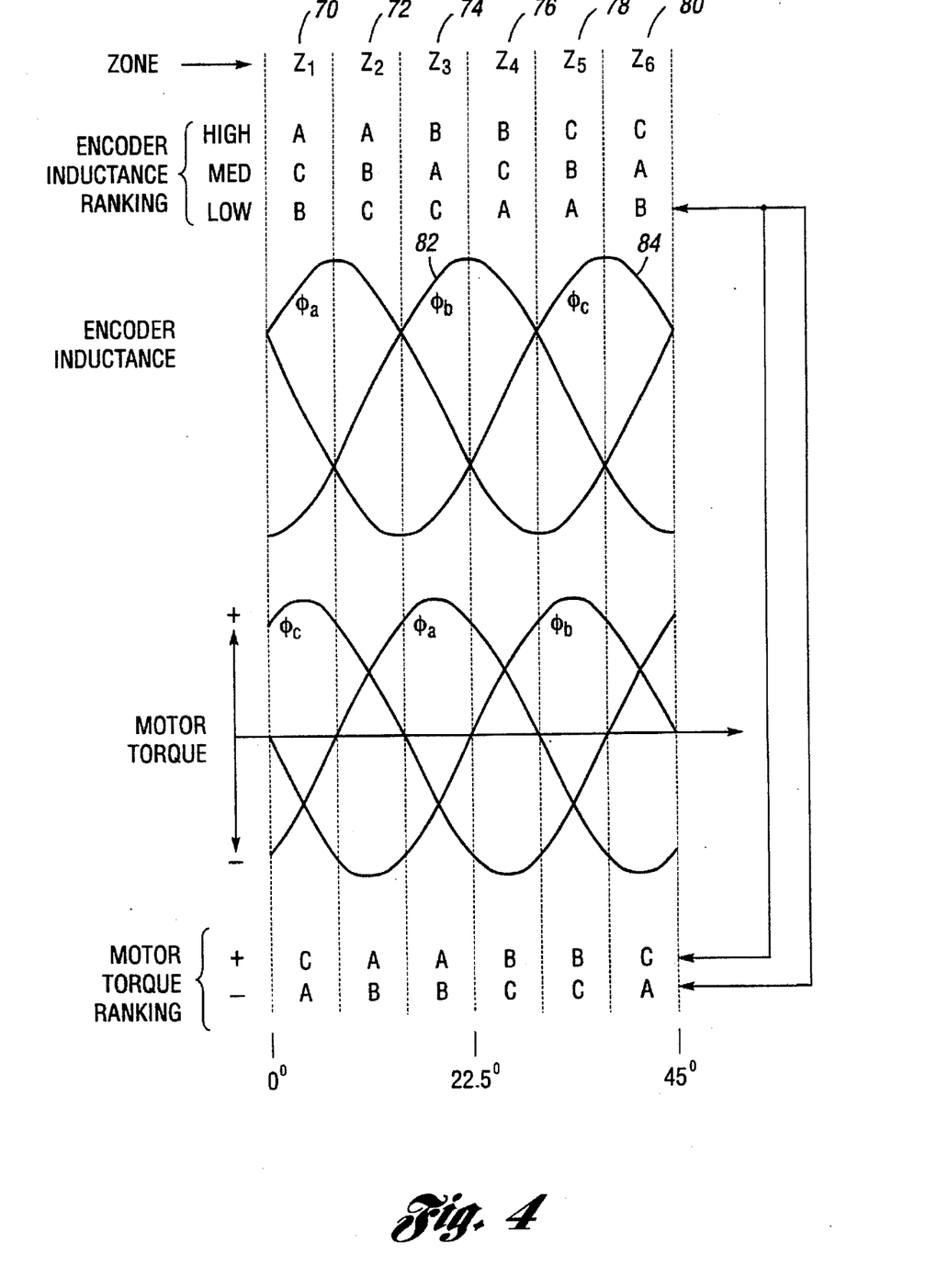
FIG. 4 is a schematic diagram illustrating the relationship between the motor torque profile for a typical three-phase VR motor and the inductance profile of the inductance sensor of FIG. 2 for high-speed motor/encoder operation.

FIG. 4 illustrates the same relationships as FIG. 1 except that the waveforms are shifted in space to allow for high-speed operation. As those skilled in the art will recognize, low-speed operation and motor start-up require a greater amount of positive torque. Under high-speed operation, however, it may take time for the current to build and thus by the time a selected phase is turned on, it may be too late or the current may be too low and an opportunity to develop torque may have been lost.

As in FIG. 1, the motor torque profile of motor 48 and the inductance profile of position sensor (encoder) 46 are shown in FIG. 4 over an angle of 45 mechanical degrees (zones $Z_1(70)$, $Z_2(72)$, $Z_3(74)$, $Z_4(76)$, $Z_5(78)$, and $Z_6(80)$), each spanning 7.5°. The motor torque profile and the position sensor profiles each comprise three phase-separated, pseudo-sinusoidal waveforms. In contrast to the low-speed operation of FIG. 1, however, for positive motor torque, the lagging motor phase is desired and for negative motor torque, the leading motor phase is desired. In each case, this may be determined by reference to the minimum position sensor value. Thus, in zone $Z_1(70)$, for positive motor torque, $\phi_b(82)$ should be on. Likewise, for positive motor torque in zone $Z_2(72)$, $\phi_c(84)$ should be on, and so on.

Figure 5:
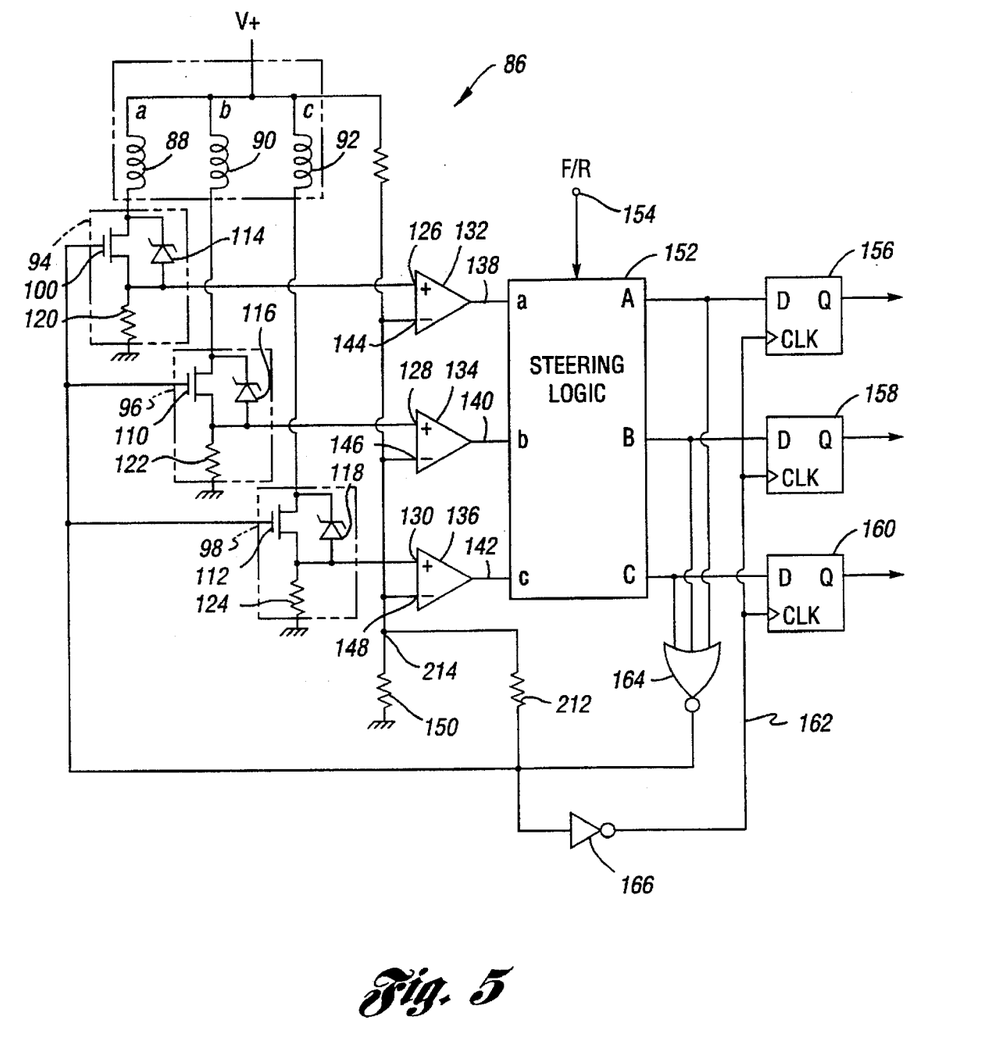
FIG. 5 is a schematic diagram of the excitation circuit of the present invention.

The excitation electronics are shown in FIG. 5 and designated generally by reference numeral 86. Electronics 86 are used to convert the changing position sensor inductance values to digital values and in turn to generate an output signal having a value corresponding to the phase of the motor to apply current to so as to commutate rotor 42. Excitation electronics 86 include a plurality of encoder coils 88, 90 and 92, each corresponding to a different phase of the encoder 46 and the VR motor 48. Encoder coils 88, 90 and 92 are each provided in electrical communication with a corresponding switch designated generally by reference numerals 94, 96 and 98. In the preferred embodiment, each of these switches constitutes a power MOSFET 100, 110 and 112, a zenor diode 114, 116 and 118, and a resistor 120, 122 and 124.

Each of the switches 94, 96 and 98 has an input 126, 128 and 130 to a corresponding comparator 132, 134 and 136.

The outputs of the comparators 138, 140, and 142 signal when the current in their respective variable reluctance coils reach a predetermined level as set by variable voltage source 150 to the inverting inputs 144, 146 and 148 to comparators 126, 128 and 130. Steering logic 152 includes a forward/reverse input 154 and provides outputs to respective flip-flops 156, 158 and 160, both directly and through a return path 162 via NOR gate 164 and inverter 166. The outputs of latches 156, 158 and 160 are used for memory to hold power on the rotor coils during each excitation cycle of the position sensor to determine which of the motor coils should be powered so as to commutate the VR motor 48.

In operation, excitation electronics 86, and in particular, comparators 132, 134, and 136 can only determine which of the encoder coils 88, 90 or 92 is a low, middle or high value by the order in which they cycle. The inductance/motor torque ranking/rotor position relationships shown in FIGS. 1 and 4 thus provide the means to determine which phase of the motor to apply current to so as to control the rotor as desired.

If negative torque is desired, for example, FIG. 1 provides the information to determine that for start-up and low-speed operation, the encoder phase with the minimum inductance should be used. Thus, whichever comparator is first to toggle, i.e., exceed the reference voltage, is the comparator with the minimum inductance. This is true because it is known that the lower the inductance, the faster the current rises. In contrast, the greater the inductance the slower the current rises. Armed with this information, means must be provided for making this decision. The steering logic of FIG. 6 (low-speed operation) and FIG. 7 (high-speed operation) provides this logic.

Figure 6:
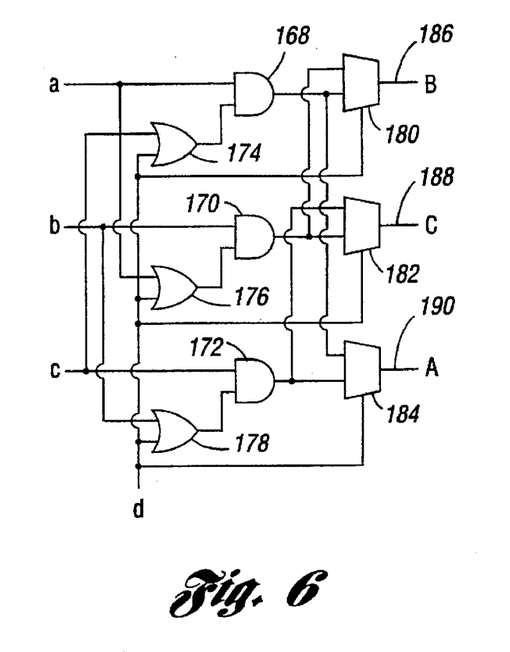
FIG. 6 is a logic diagram for the excitation electronics of FIG. 6 and the inductance profile motor torque profile of FIG. 5.

As shown, the steering logic of FIG. 6 includes a plurality of AND gates 168, 170 and 172 each of which receives a corresponding input from a comparator 132, 134 or 136. AND gates 168, 170 and 172 also receive a corresponding input from a corresponding OR gate 174, 176 or 178. The outputs of AND gates 168, 170 and 172 are input to corresponding multiplexers 180, 182 and 184 which, in turn, provide outputs 186 (B), 188 (C), and 190 (A) (inputs to respective latches 158, 160 and 156 shown in FIG. 6). The logic of FIG. 6 may be expressed by the following Boolean equation:

$$A = (b \cdot c \cdot d') + a \cdot d$$

$$B = (a \cdot c \cdot d') + b \cdot d$$

$$C = (a \cdot b \cdot d') + c \cdot d$$

where d=1 for reverse operation (negative motor torque) and d=0 for forward operation (positive motor torque).

Figure 7:
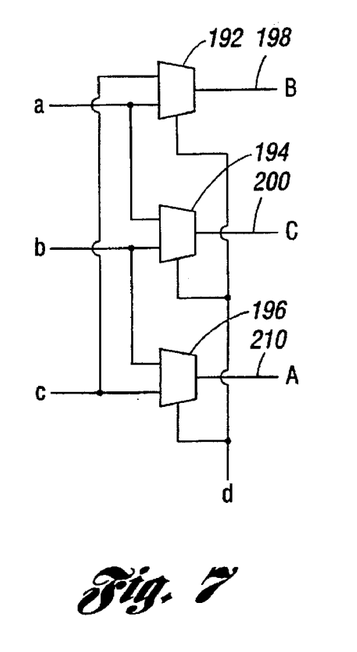
FIG. 7 is a logic diagram for the excitation electronics of FIG. 6 and the inductance profile/motor torque of FIG. 1.

Steering logic for high-speed motor/encoder operation is shown in more detail in FIG. 7. Here, the steering logic includes a plurality of multiplexers 192, 194 and 196 each of which receives an input from a corresponding comparator 132, 134 and 136 and has a corresponding output 198 (B), 200 (C) and 210 (A) for input to respective latches 158, 160 and 156. This steering logic may be expressed by the following Boolean equation:

$$A = (c \cdot d') + b \cdot d$$

$$B = (a \cdot d') + c \cdot d$$

$$C = (b \cdot d') + a \cdot d$$

where d=1 for reverse operation (negative motor torque) and d=0 for forward operation (positive motor torque).

The operation of the steering logic referenced above may be more fully understood by reference to the following low-speed example. Consider a situation where in zone $Z_1(110)$, there is a moment in time (also in zone $Z_1$) where the output of NOR gate 164 switched from a zero to a logic 1 state. At that instant in time, the current in the encoder coils 88, 90 and 92 begins to increase. As shown in FIG. 1 of the drawings, $\phi_A$ in zone $Z_1$ has the maximum inductance. Thus, the current will rise the slowest on that particular phase. $\phi_B$ also has the least amount of inductance. In operation, the voltage presented to the non-inverting input 146 of comparator 134 reaches the reference voltage first. It therefore switches to a logic 1. The "b" input 140 of FIG. 6 is thus presented with a logic 1. Because the focus is on positive torque, the "d" input 154 has a zero state.

Still referring to FIG. 5, the "b" input 140 remains at logic 1 because the currents are beginning to build and exceed the reference value for comparator 134. However, as time progresses, the voltage presented to comparator 136 also exceeds the threshold voltage because it is the next level of inductance. At that instant in time, the output 140 (also referred to as "b") of comparator 134 is at logic 1, and the output 142 (also referred to as "c") of comparator 136 has just reached a logic 1. d' is always at logic 1 because positive torque has been selected.

Returning to the Boolean equation, it can be seen that the only equation which meets the condition for a logic 1 is the "A" output 190 to latch 156. This is true because outputs "A" 186 and "C" 188 to respective latches 158 and 160 are blocked out at zeros because $\phi_A$ has not reached a logic 1 yet. The second term of the Boolean equations are thus not reviewed because each is blocked out at zero due to the value of select line 154 for forward operation (positive motor torque).

The steering logic functionality is, of course, dynamic in that it changes instantaneously in time. Thus, at the instant that comparator 136 sees a logic 1, the Boolean equation for output 130 (the input to latch 156) is satisfied. Output 190 ("A") thus converts to a logic 1 and outputs 186 ("B") and 188 ("C") for an instant in time remain zero.

When output 190 ("A") changes to a logic 1, gate 164 sees a logic 1 at its input, the output of gate 136 changes to 0 and turns off the power on the encoder coils 88, 90 and 92. In accordance with the invention, the encoder coil with the largest inductance never sees a 1. When gate 164 becomes a logic 0, the latches 156, 158 and 160 are clocked and output 190 ("A") having a logic 1 now is input to latch 156 and outputs 186 and 188 which are at 0 are provided to latches 158 and 160, respectively. These values are saved. When gate 164 changes to a logic 0, the reference value for comparators 132, 134 and 136 is now lowered to a lower threshold through resistor 212 which pulls down the reference node 214. This time, it is irrelevant if any of the comparators 132, 134 or 136 change state because the values are being latched in at the latches. Thereafter, all the currents begin to decay in the coils 88, 90 and 92.

As soon as outputs 190, 188 and 186 change to zero again, because of the change in the reference value and the turning off of the FETS 94, 96 and 98, then the cycle repeats itself all over again. This is true because when outputs 190, 188, and 186 are zero, gate 164 turns on again and the process repeats itself whereupon the comparators 132, 134 and 136 toggle once again.

Figure 8:
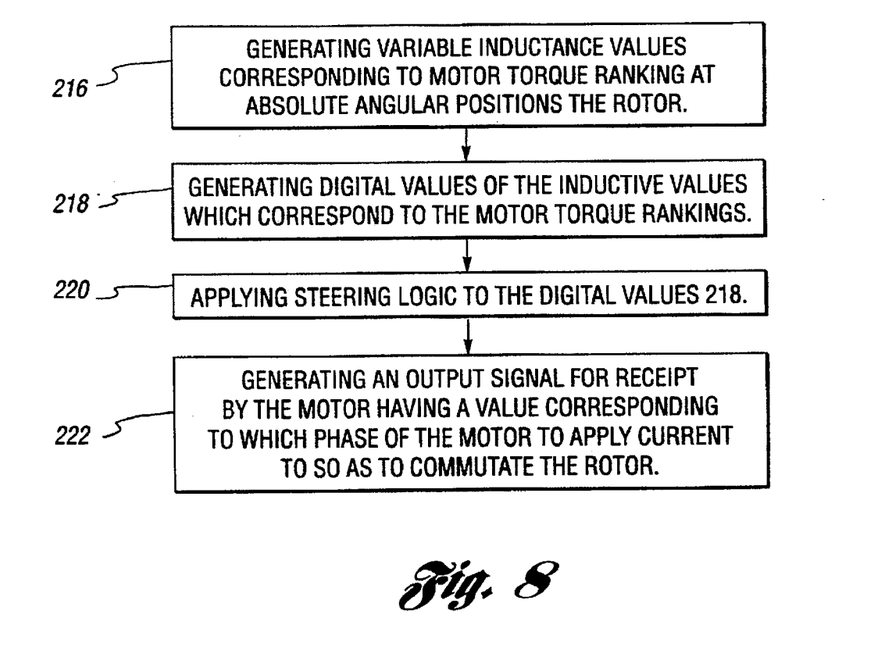
FIG. 8 is a generalized block diagram of the method steps of the present invention.

Turning now to FIG. 8 of the drawings, the method steps of the present invention may be more particularly described. As indicated herein, a method is provided for exciting a three-phase VR position sensor. The described method may be used to commutate a three-phase VR motor. The method includes generating 216 variable inductance values corresponding to motor torque rankings at absolute angular positions of the rotor. Once the variable inductance values have been generated, digital values may be generated 218 of the inductance values which correspond to the motor torque rankings. Finally, by applying 220 steering logic to the digital values, an output signal may be generated 222 for receipt by the motor. The output signal has a value corresponding to which phase of the motor to apply current to so as to commutate the motor.

While the best modes for carrying out the invention have been described in detail, those familiar with the art to which this invention relates will recognize various alternative designs and embodiments for practicing the invention as defined by the following claims.

What is claimed is:

1. An encoder system for commutating a three-phase variable reluctance motor having motor torque rankings at absolute angular positions of the motor's rotor, comprising:

a power source;

a position sensor adapted to generate variable inductance values in the form of three pseudo-sinusoidal waveforms, each pseudo-sinusoidal waveform of inductance values, corresponding to a respective one of said motor torque rankings; and excitation electronics in electrical communication with said position sensor and said variable power source for converting said inductance values to a sequence of digital signals, the sequence indicating which phase of the motor to apply current to so as to commutate the motor, said excitation electronics including steering logic responsive to said sequence of digital signals to generate an output signal having a value corresponding to the phase of the motor indicated.

2. A method for commutating a three-phase variable reluctance motor, comprising:

generating with a position sensor, variable inductance values in the form of three phase separated pseudo-sinusoidal waveforms, each pseudo-sinusoidal waveform corresponding to a respective one motor torque ranking of the three phase motor at absolute angular positions of the rotor;

generating from said inductance values a sequence of digital signals corresponding to said motor torque rankings, the sequence indicating which phase of the motor to apply current to so as to commutate the motor;

applying said digital signals to a steering logic to generate an output signal identifying the phase of the motor to apply current to; and applying current to the phase of the motor identified by said output signal to commutate the motor.

3. A method for commutating a three-phase variable reluctance motor having a plurality of torque rankings, comprising:

connecting an inductance sensor to the rotor of said variable reluctance motor, said inductance sensor generating variable inductance values in the form of phase separated pseudo-sinusoidal waveforms corresponding to the motor torque rankings at absolute angular positions of the rotor of the variable inductance motor;

exciting said inductance sensor to generate said variable inductance values;

converting said variable inductance values to a sequence of digital signals, the sequence indicating which phase of the motor to apply current to so as to commutate the motor; and applying said sequence of digital signals to steering logic to generate signals having values corresponding to the phase of the motor indicated.

* * * * *